Aug. 9, 1938.     D. S. HUBBELL     2,126,191
COMPOSITE CEMENTITIOUS ARTICLE
Filed Oct. 3, 1935

Inventor.
Dean S. Hubbell
by Jas. H. Churchill
atty.

Patented Aug. 9, 1938

2,126,191

UNITED STATES PATENT OFFICE 2,126,191

COMPOSITE CEMENTITIOUS ARTICLE

Dean S. Hubbell, Pittsburgh, Pa., assignor to H. H. Robertson Company, Pittsburgh, Pa., a corporation of Pennsylvania Application October 3, 1935, Serial No. 43,381

3 Claims. (Cl. 72—69)

This invention relates to a composite cementitious article.

In general the invention has for an object to provide a novel composite cementitious article composed in part of an hydraulic cement and in part of a magnesium oxychloride cement contacting with, and perfectly bonded to, the hydraulic cement whereby a composite article is formed in which the desirable characteristics and properties inherent in each of these cements may be utilized.

A further and more specific object of the invention is to provide a composite article comprising a layer of hydraulic cement and a layer of a copper-bearing magnesium oxychloride cement contacting with the hydraulic cement and bonded perfectly thereto.

With these objects in view and such others as may hereinafter appear, the invention consists in the composite cementitious articles and in the method of making the same hereinafter described and particularly defined in the claims at the end of this specification.

Figure 1:
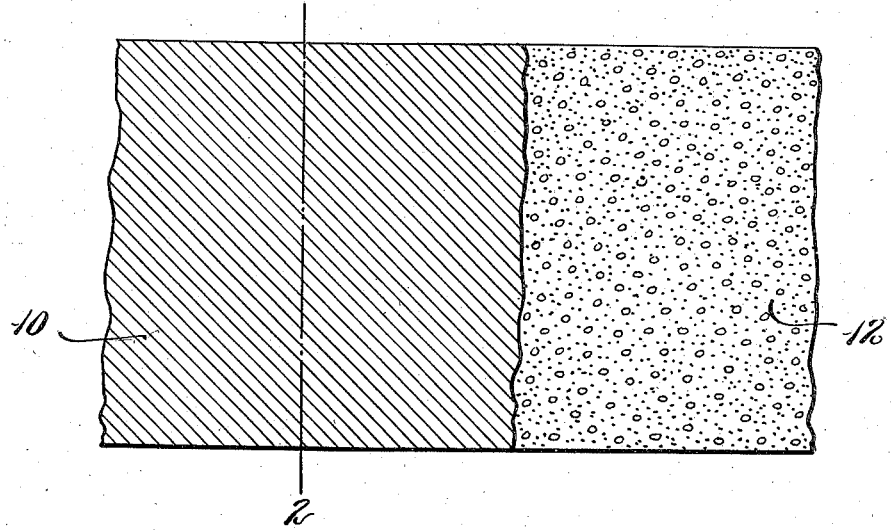
Figure 2:
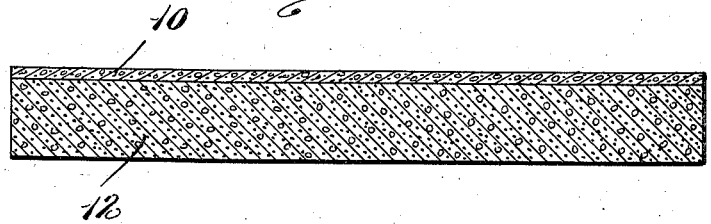
Figure 3:
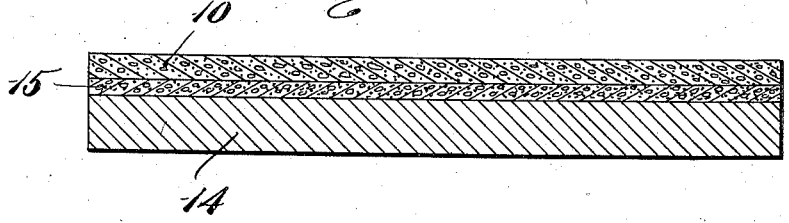

In the drawing illustrating the preferred embodiment of the invention, Fig. 1 is a plan, Fig. 2 is a cross section of a composite cementitious article embodying the invention, and Fig. 3 is a sectional view to be referred to.

Prior to the present invention in commercial practice it has not been considered possible or practical to bond magnesium oxychloride cements with hydraulic cements such as Portland cement, and the present invention is based upon the discovery that copper bearing magnesium oxychloride cements produced in accordance with the disclosure in my co-pending application Serial No. 748,114 possess the ability of adhering to and forming a perfect bond with a hydraulic cement such as Portland cement. In order to obtain the most satisfactory bond between my improved magnesium oxychloride cement and a hydraulic cement it is preferable that the hydraulic cement be in a non-plastic condition and preferably in a condition in which it has at least taken its final set and has reached a condition corresponding to that produced by several days' curing at ordinary temperatures. By applying my copper bearing magnesium oxychloride cement in a plastic condition to hydraulic cement in a non-plastic condition and permitting the composite material to harden, I have found that a substantially perfect bond may be produced between the magnesium oxychloride cement and the hydraulic cement. This bond results from the adhesion of the magnesium oxychloride cement to the hydraulic cement.

In general and in the building art particularly, it has been recognized that hydraulic cements such as Portland cement possess certain inherent shortcomings among which may be mentioned their lack of adhesion to many other materials, even to bodies of the same cement that have become hardened. In practice when it is necessary or desirable to add additional Portland cement to an existing Portland cement structure, such for example as when it is necessary to patch such a structure or to join an additional portion with it, a very poor bond is produced between the newly applied Portland cement mass and the hardened existing Portland cement structure. Another difficulty which has been experienced with ordinary Portland cement in the building art is its insufficient resistance to abrasion when subjected to many uses, such as for concrete floors and the like over which there is heavy traffic. The concrete or Portland cement floor or other structure soon dusts and wears, and in general in an untreated condition provides a most unsatisfactory traffic surface. As a result additional floor finishes and coverings are in most instances required to be used. Another difficulty which has been experienced with Portland cement and compositions thereof in the building art is the difficulty of imparting a decorative color to the Portland cementitious article, and for this reason the use of Portland cement for some purposes has been restricted.

On the other hand commercial forms of magnesium oxychloride cement which have been upon the market prior to my copper bearing magnesium oxychloride cement above referred to are of themselves too expensive for use in mass construction involving large masses of the cementitious material. In addition the heat reaction of the magnesium oxychloride cements is too great to permit of their general use in large masses. The present invention therefore enables the desirable characteristics and properties of both types of cement and compositions thereof to be utilized in a practical way by combining my improved copper bearing magnesium oxychloride cement with an hydraulic cement such as Portland cement.

Referring now to the drawing, which as above stated illustrates diagrammatically any composite article embodying the invention, 10 represents a layer of hydraulic cement such as Portland cement and 12 a layer of my improved magnesium oxychloride cement. The magnesium oxychloride cement adheres to and bonds with the surface of the hydraulic cement. In producing the composite article the hydraulic cement layer 10 is first formed in any usual or preferred manner and permitted to reach a non-plastic condition, and preferably a condition in which it has at least taken its final set and has reached a condition corresponding to that produced by several days' curing at ordinary temperatures. The copper bearing magnesium oxychloride cement produced in accordance with the disclosure of my co-pending application above referred to, and preferably containing finely divided copper distributed throughout the mass thereof, is then rendered plastic and applied to the surface of the hydraulic cement layer in accordance with any usual or preferred procedure, and thereafter the composite material is permitted to harden until both component layers reach a condition of hardness permitting them to be handled or otherwise treated, at which time the bond between the magnesium oxychloride layer 12 and the hydraulic cement layer 10 will have been thoroughly established. The rate of hardening of the magnesium oxychloride cement layer as well as the Portland cement layer may be controlled in accordance with any usual or preferred procedure.

In many instances, in practice it may be desirable to produce a composite article embodying the present invention utilizing a previously formed and hardened hydraulic cement layer or article 10, in which case the improved magnesium oxychloride cement layer may be applied directly to the desired surface of the previously formed and hardened hydraulic cement layer and an extremely strong bond is produced between the component layers.

In the application of my improved copper bearing magnesium oxychloride cement layer to the hydraulic cement layer, particularly when the hydraulic cement layer has been previously formed and hardened, as for example when it is desired to apply a layer of magnesium oxychloride cement to a concrete floor, I prefer to assist the wetting of the concrete surface by the application and rubbing of a small amount of the magnesium oxychloride cement over the surface of the concrete floor so as to break down the surface tension and establish an intimate contact between the magnesium oxychloride and the actual surface of the hydraulic cement layer.

As above stated, I have found that a composite cementitious material produced in accordance with this invention possesses an extremely strong bond between the magnesium oxychloride layer and the hydraulic cement layer. This bond is permanent in nature and enables the layers to remain in contact even when the material is subjected to wetting with water, and in this respect the present composite material is an important improvement over any composite materials of similar nature of which I am aware. While I am not certain of the reasons and explanation of the production of the present improved bond as a result of my research work upon the subject matter, it is my belief that the permanency and efficiency of the bond between my improved copper bearing magnesium oxychloride cement layer and the hydraulic cement layer is due primarily to the fact that upon wetting of the magnesium oxychloride layer containing the copper very little magnesium chloride may be leached out, and as a result the disintegration of the bond is prevented. When an ordinary magnesium oxychloride layer is subjected to wetting appreciable amounts of magnesium chloride are dissolved, not only weakening the magnesium oxychloride layer and diminishing the adhesive strength at the bonding surface, but also the dimensional changes in the magnesium oxychloride cement which accompany its disintegration by water mechanically disrupt the bond between the magnesium oxychloride layer and the hydraulic cement layer, and as a result, in practice it has heretofore been the experience that any bond which was produced between the magnesium oxychloride cement and the hydraulic cement was not at all permanent when subjected to the ordinary practical conditions involving at least occasional wetting by water. In addition it is possible that as the magnesium chloride is leached from the ordinary magnesium oxychloride layer, a reaction occurs at the bonding surface between the magnesium chloride and the lime formed by hydrolysis of the Portland cement, and as a result the strength of the bond between the two layers would be greatly diminished.

My improved copper bearing magnesium oxychloride cement not only diminishes the leaching of magnesium chloride therefrom to an extent such as to prevent the undesirable effects above mentioned, but also the improved magnesium oxychloride cement itself when wet possesses sufficient strength to preserve the bond between it and the hydraulic cement layer. The improved water resistant characteristics of my improved magnesium oxychloride cement eliminate dimensional changes and the damage which would otherwise occur to the bond between the layers of the cements.

The composite cementitious structure produced in accordance with the present invention may be embodied in various commercial structures such, for example, as in the resurfacing of existing cement floors, in order to provide such floors with a colored or decorated surface and also in order to provide such floors with a traffic surface or a surface suitable for resisting abrasion and a surface possessing little or no tendency to dust. In this connection, for sidewalks and other surfaces where hydraulic cement is used, the present composite material may be used with advantage to provide a desirable traffic surface. In addition, of course, in the laying of new floors the improved composite material may be successfully used to obtain the foregoing desirable characteristics of a dustless, colored, and stronger surface.

In the building art at the present time various hydraulic cement products are sold and used, such, for example, as the well-known cement-asbestos shingles and cement-asbestos roofing and siding sheets, and these articles of manufacture may with advantage be surfaced in accordance with the present invention by a layer of my improved magnesium oxychloride cement, thus producing composite articles of manufacture possessing characteristics and properties not possessed by the original cement-asbestos products now on the market. In addition, to enable attractively colored surfaces to be obtained on these improved products, the magnesium oxychloride surface lends itself particularly to painting and the reception of other coating materials, for decorative purposes. Also, the magnesium oxychloride surface is adapted to the provision of texturing effects and, the increased strength and rigidity which the magnesium oxychloride imparts to the composite structure enables the shingles and other cementitious products to be produced more economically and with decreased weight and other inherent advantages.

In addition to its use as a surfacing layer 12, the improved hydraulic cement structure may be used with advantage in joining any hydraulic cement structure to another hydraulic cement structure or in fact to wood or any other material to which the improved magnesium oxychloride cement will adhere. This is illustrated in Fig. 3 in which 10 represents a hydraulic cement structure or article and 14 represents another structure of wood, hydraulic cement or any other material to which the improved magnesium oxychloride cement layer 15 will adhere, to thereby successfully bond and join together the two structures 10 and 14 which heretofore have been only joined with an imperfect bond. In some instances it may be desirable to reenforce or strengthen certain parts of an existing structure composed of hydraulic cement, and for this purpose I may apply my improved magnesium oxychloride cement to such parts as, for example, where it is desirable to attach to the hydraulic cement structure an appurtenance of any sort.

The foregoing indicates in a general way the utility and application of the present invention to the various branches of the building art, but it is to be understood that the invention is not limited thereto.

Having thus described the invention, what is claimed is:—

1. A composite cementitious article comprising an underlying cementitious layer comprising a hydraulic cement and an overlying cementitious layer comprising a copper bearing magnesium oxychloride cement bonded to the hydraulic cement.

2. A composite cementitious article comprising an underlying cementitious layer comprising Portland cement and an overlying cementitious layer comprising a copper bearing magnesium oxychloride cement bonded to the Portland cement.

3. A composite cementitious article comprising an underlying layer of a hydraulic cement and an overlying layer of a copper bearing magnesium oxychloride cement bonded to the hydraulic cement, said magnesium oxychloride cement being of a characteristic bluish green color as a result of reaction between the magnesium chloride or copper contained in such cement.

DEAN S. HUBBELL.